(12) United States Patent
Breslin et al.

(10) Patent No.: US 8,599,692 B2
(45) Date of Patent: *Dec. 3, 2013

(54) SYSTEM, APPARATUS AND METHOD FOR REMOVING UNWANTED INFORMATION FROM CAPTURED DATA PACKETS

(75) Inventors: Terence M. Breslin, San Mateo, CA (US); David Kucharczyk, Santa Fe, NM (US); Jan Allen Hinshaw, Prescott Valley, AZ (US)

(73) Assignee: VSS Monitoring, Inc., Sunnyvale, CA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/904,488

(22) Filed: Oct. 14, 2010

(65) Prior Publication Data

US 2011/0110220 A1   May 12, 2011

Related U.S. Application Data

(60) Provisional application No. 61/251,673, filed on Oct. 14, 2009.

(51) Int. Cl.
*H04L 12/26*   (2006.01)

(52) U.S. Cl.
USPC ............ 370/235; 370/216; 370/389; 370/474

(58) Field of Classification Search
USPC ........................ 370/458, 333, 328, 351, 389
See application file for complete search history.

(56) References Cited

U.S. PATENT DOCUMENTS

| | | | |
|---|---|---|---|
| 7,948,986 B1* | 5/2011 | Ghosh et al. | 370/392 |
| 2001/0055274 A1* | 12/2001 | Hegge et al. | 370/229 |
| 2002/0080819 A1* | 6/2002 | Tsao | 370/469 |
| 2003/0142672 A1* | 7/2003 | Chen et al. | 370/390 |
| 2005/0237969 A1* | 10/2005 | Jung et al. | 370/328 |
| 2009/0135833 A1* | 5/2009 | Lee et al. | 370/395.53 |
| 2011/0141937 A1* | 6/2011 | Breslin et al. | 370/252 |
| 2012/0027014 A1* | 2/2012 | Mack-Crane et al. | 370/390 |

* cited by examiner

*Primary Examiner* — Gary Mui
*Assistant Examiner* — Lan Truong
(74) *Attorney, Agent, or Firm* — Edwards Wildman Palmer LLP; Scott D. Wofsy; Christopher J. Capelli (57) ABSTRACT

Data packets received at network traffic distribution device are analyzed to determine whether they include unwanted information, and, if so, the network traffic distribution device removes the unwanted information and then transmits the data packets, absent the unwanted information, to an assigned egress port (e.g., a monitor port communicatively coupled to a monitoring device). The flow of data packets may be received at the network traffic distribution device from a mirror port resident on a source of the captured data packets and/or a traffic capture point located along a communication link between two communicating devices within a network. In addition to analyzing the data packets and removing unwanted information therefrom, the network traffic distribution device may perform additional operations on the data packets as well.

13 Claims, 9 Drawing Sheets

| 501 | Header 505 | Unwanted information 510 | Payload 515 | Old FCS/CRC 520 |

FIG. 5A

| 502 | Header 505 | Payload 515 | New FCS/CRC 530 |

SYSTEM, APPARATUS AND METHOD FOR REMOVING UNWANTED INFORMATION FROM CAPTURED DATA PACKETS

RELATED APPLICATIONS

This application is a NONPROVISIONAL of, claims priority to and incorporates by reference U.S. Provisional Patent Application 61/251,673, filed 14 Oct. 2009.

FIELD OF THE INVENTION

The present invention relates to a network captured traffic distribution device and, in particular, such a device as is configured for removing unwanted information from captured data packets.

BACKGROUND

In order to facilitate communication of data packets through complex communication networks, infrastructure equipment supporting the communication network, such as routers, frequently insert information (e.g., routing information) into data packets flowing through the communication network in order to assist in the routing and/or tracking of the data packets as are they are transmitted through the communication network. Only the infrastructure equipment responsible for transmitting the data packets through the communication network typically understands the information added to data packets. Interception or capture of these data packets for network communication monitoring or analysis purposes can therefore be problematic, as the monitoring and analyzing devices have difficulty understanding the additional information inserted into the data packet by the computer networking infrastructure. This confusion leads to inefficiency, latency, and decreased throughput in the processing of data packets by network monitoring and analysis equipment.

SUMMARY OF THE INVENTION

In embodiments of the present invention, a flow of captured data packets is received at network traffic distribution device and analyzed to determine whether the data packets include unwanted information, for example information pushed into or appended to the data packets by a router. Such information may include routing or other forms of network address or distribution information, general packet radio service (GPRS) tunneling protocol (GTP) information, multi-protocol label switching (MPLS) information and/or a virtual local area network (VLAN) tag. If such information exists within the data packets, the network traffic distribution device removes the unwanted information and then transmits the data packets, absent the unwanted information, to an assigned egress port (e.g., a monitor port communicatively coupled to a monitoring device). The flow of data packets may be received at the network traffic distribution device from a mirror port resident on a source of the captured data packets and/or a traffic capture point located along a communication link between two communicating devices within a network. In addition to analyzing the data packets and removing unwanted information therefrom, the network traffic distribution device may perform additional operations on the data packets, for example, filtering of the data packets, aggregating the received data packets, and/or balancing transmission of the data packets stripped of the unwanted information across the plurality of egress ports of the network traffic distribution device. Determining which egress port(s) is/are assigned to the data packets may be based on configuration information stored at the network traffic distribution device.

In further embodiments of the present invention, a network traffic distribution device receives a captured data packet that includes GTP information, analyzes the data packet to locate the GTP information, removes the GTP information from the data packet, determines a monitoring port assigned to the data packet, and transmits the data packet, without the GTP information, to the assigned egress port.

In other embodiments of the present invention, a network traffic distribution device receives a captured data packet that includes MPLS information; analyzes the data packet to locate the MPLS information, removes the MPLS information from the data packet, determines a monitoring port assigned to the data packet, and transmits the data packet, without the MPLS information, to the assigned egress port.

Still further embodiments of the present invention involve a system that includes a pair of routers, one of which pushes into or appends onto a data packet, routing information, and transmits the data packet, with the routing information, to the other, via a communication link coupling the two routers to one another. Preferably, the first router includes a mirror port, and the system also includes a network traffic distribution device that is coupled to the router's mirror port for receiving captured data packets. Alternatively, or in addition, the network traffic distribution device may also be coupled to receive data packets from a traffic capture point located on the communication link. Data packets are generally received via one or more ingress ports on the network traffic distribution device. Once received, the network traffic distribution device removes the information pushed into or appended onto the data packet and transmits the data packet, without the information, to an external device (e.g., a monitor, network traffic analyzer or other device).

Yet another embodiment of the present invention provides a network traffic distribution device that includes a plurality of ingress ports for receiving captured data packets and a processor for processing the data packets to remove unwanted information therefrom and thereby create processed data packets. The unwanted information may include information pushed into or appended to the data packets by a network device such as a router or switch, and so may be routing or other network address or distribution information, GTP information, MPLS information and/or a VLAN tag. The network traffic distribution device may also include an application specific integrated circuit (ASIC) for routing received data packets to the processor and for routing processed data packets to respective, assigned ones of a plurality of egress ports, which egress ports are for transmitting the processed data packets from the network traffic distribution device. The network traffic distribution device may also include a data store for storing a set of instructions executable by the processor and/or the application specific integrated circuit for performing the above-described operations.

These and other embodiments of the present invention are discussed in greater detail below.

BRIEF DESCRIPTION OF THE DRAWINGS

The present application is illustrated by way of example, and not limitation, in the figures of the accompanying drawings, in which.

DETAILED DESCRIPTION

Described herein are methods, systems and apparatus for removing unwanted information (e.g., routing information) from data packets. As indicated above, in embodiments of the present invention a network traffic distribution device (such as a network tap or other device) is configured to processing captured data packets to remove unwanted information therefrom and then transmit the data packets (now stripped of the unwanted information) to a monitor or other device. Unwanted information to be stripped from the data packets may include information pushed into or appended to the data packets by a network device such as a router or switch, and so may be routing or other network address or distribution information, GTP information, MPLS information and/or a VLAN tag, etc. The subject network traffic distribution device may a processor for performing the analysis and information stripping, and may also include an ASIC for routing received data packets to the processor (from an ingress port of the device) and for routing processed data packets to respective, assigned ones of a plurality of egress ports. The network traffic distribution device may also include a data store (e.g., a read-only memory (ROM), erasable programmable read only memory (EPROM), electrically erasable programmable read only memory (EEPROM), random access memory (RAM), flash memory, other form of storage device) for storing a set of instructions executable by the processor and/or the application specific integrated circuit for performing the above-described operations.

Figure 1:
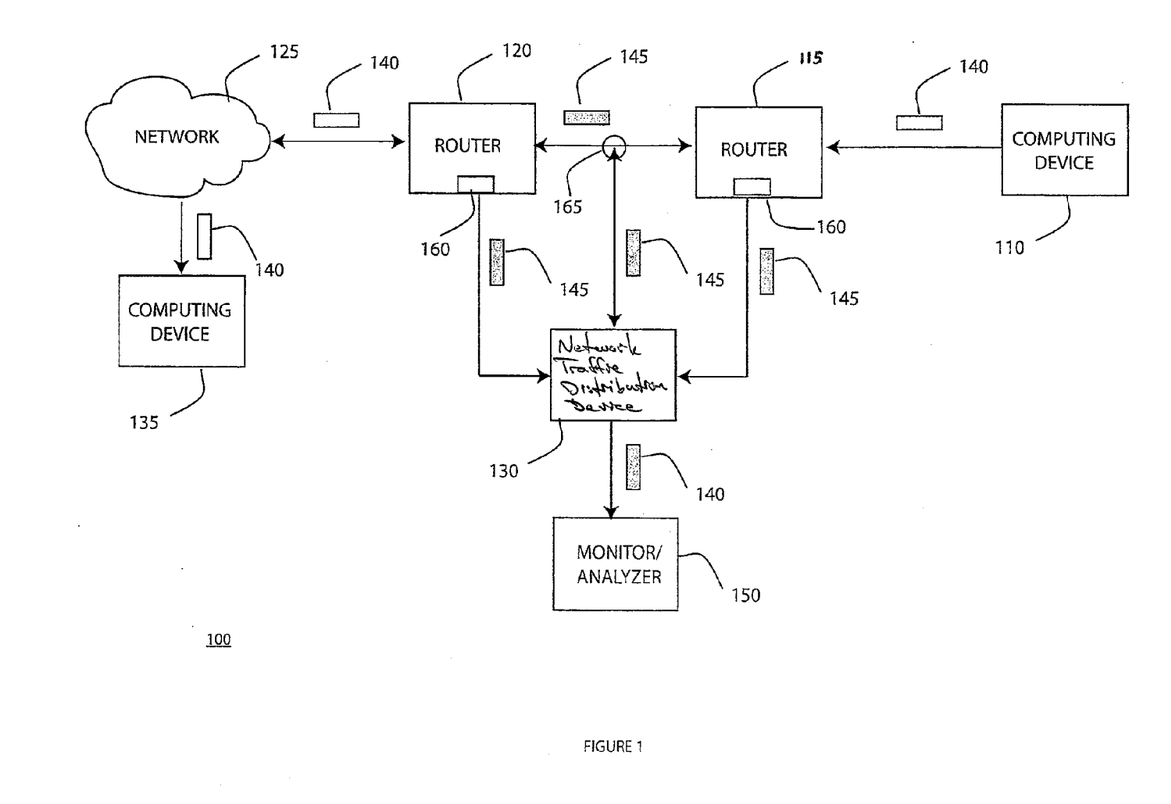
FIG. 1 is a block diagram of a network communications system, configured in accordance with an embodiment of the present invention.

FIG. 1 is a block diagram of a network communications system 100. System 100 may be any appropriate system for performing the methods described herein. For example, system 100 may be a telecommunications system such as a GSM or MPLS network. In some embodiments, system 100 may be GPRS system, an Enhanced Data Rates for GSM Evolution (EDGE), an Enhanced GPRS (EGPRS) system, an International Mobile Telecommunications-2000 (IMT-2000) system, an IMT Single Carrier (IMT-SC) system, an Universal Mobile Telecommunications System (UMTS) system, an Long Term Evolution (LTE system), a Code Division Multiple Access (CDMA) system, a system compliant with the IEEE 802.1 Q standard for configuring VLANs, or a system enabled to transmit and/or receive data packets including VLAN tags.

Figure 5A:
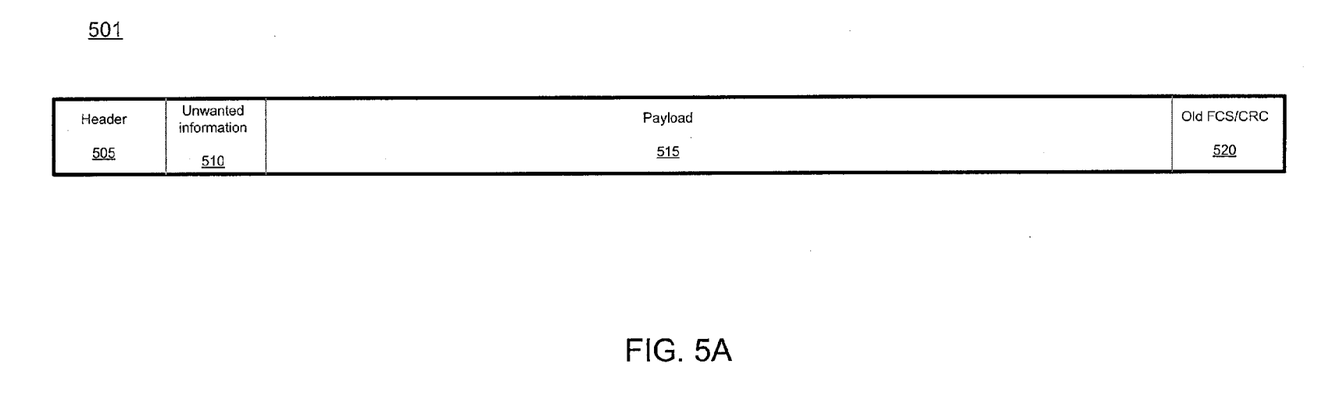
FIG. 5a is a block diagram of a data packet including unwanted information, in accordance with an embodiment of the present invention.
Figure 5B:
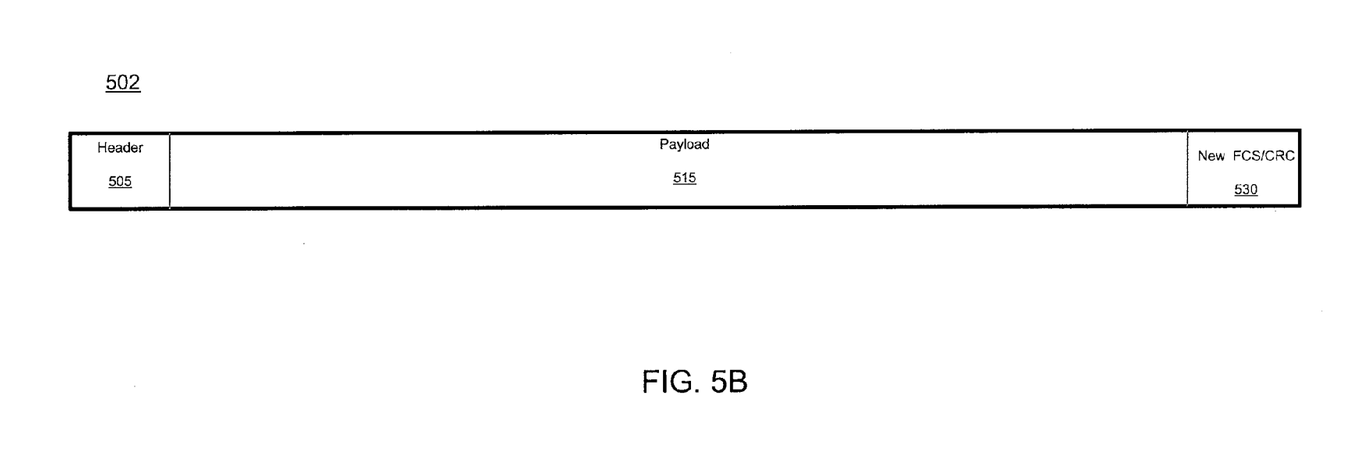
FIG. 5b is a block diagram of a data packet stripped of unwanted information, in accordance with an embodiment of the present invention.

System 100 may include a computing device 110. Exemplary computing devices 110 include personal computers, networks of computers, and mobile computing devices. Computing device 110 may generate a data packet 140 and transmit data packet 140 to a router 115. Router A may be any router enabled to route data packets through communication system 100. In the case of a GSM network, router A may be a Gateway GPRS Support Node (GGSN) or a Serving GPRS Support Node (SGSN). In the case of a MPLS network, router 115 may be a Label Edge Router (LER). Router 115 may include a mirror or switched port analyzer (SPAN) port 160. Further information regarding the content of data packet 140 is provided below with reference to FIGS. 5a and b.

Router 115 receives data packet 140 from computing device 110 and pushes or appends additional information into/to the data packet, typically in order to assist in the routing of the data packet through the communication infrastructure of system 100. The data packet, including the additional information, is represented in FIG. 1 as data packet 145, an example of which is discussed below in connection with FIG. 5a.

Router 115 communicates data packet 145 to a second router 120. Router 120 may be any router enabled to route data packets through communication system 100 and, like router 115, may include a mirror or SPAN port 160. In the case of a GSM network, router 120 may be an SGSN or a GGSN, while in the case of a MPLS network, router 120 may be an LER. Upon receipt of data packet 145, router 120 may determine that the additional information added by router 115 should be removed from or "popped off" of data packet 145. This determination is typically made when a data packet is close to its target destination in the network. Accordingly, router 120 may be configured to remove, pop off or strip the additional information added by router 115. Once the unwanted information is removed from data packet 145, the data packet is returned to its original state and resembles data packet 140. Data packet 140 is then transmitted by router 120 to network 125. Network 125 may be any computing network such as the Internet, a local area network (LAN), or a wireless local area network (WLAN). Data packet 140 transits network 125 and is transmitted to computing device 135. Computing device 135 may be any appropriate computing device, such as a personal computer, a mobile communication device, or a laptop computer, etc.

Also included in system 100 is network traffic distribution device 130, which may be any network traffic distribution device capable of receiving captured network traffic. Network traffic distribution device 130 may include a plurality of ingress and egress ports. In some cases, an egress port may be a monitor port. Network traffic distribution device 130 may be communicatively coupled to a mirror port 160 present on router 115 and/or router 120, and may receive a traffic flow of captured data packets, including data packet 145, via such a mirror port 160. Network traffic distribution device 130 may also be communicatively coupled to a traffic capture point 165 located along a communication link between router 115 and router 120, and thereby capture data packet 145 via an in-line network traffic capture.

Network traffic distribution device 130 is configured to remove unwanted or routing information pushed into or appended to data packet 145 by, for example, router 115 or router 120 and forward a data packet resembling data packet 140 to one or more external devices 150 via an egress port resident in network traffic distribution device 130. Exemplary external devices 150 include network monitors and network analyzers.

Figure 2:
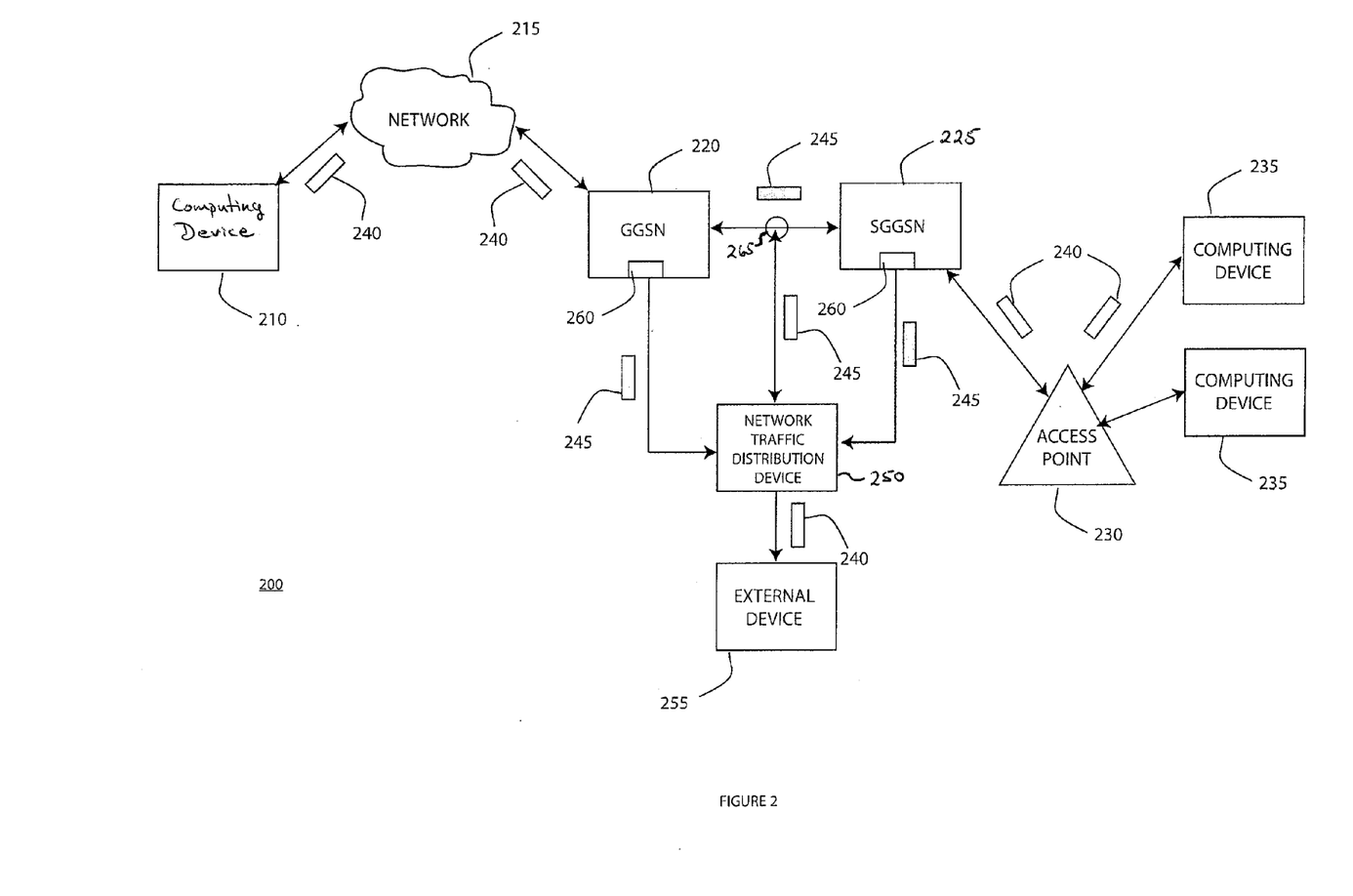
FIG. 2 is a block diagram of a Global System for Mobile communications (GSM) telecommunications system, configured in accordance with an embodiment of the present invention.

FIG. 2 illustrates an exemplary GSM telecommunications network 200. Network 200 may include a computing device 210. Computing device 210 may be any appropriate computing device such as a personal computer, a laptop computer, or a server. Computing device 210 may be configured to transmit a data packet 240 to a network 215, which may be may be, for example, the Internet, a LAN and/or a WLAN. Data packet 240 may resemble data packet 502 shown in FIG. 5b and may be transmitted from network 215 to a GGSN 220.

Upon receipt of data packet 240, GGSN 220 may insert GTP information, or a GTP header, into the data packet, thereby creating data packet 245. Data packet 245 may, in some ways, resemble data packet 501, as shown in FIG. 5a, where the "unwanted information" 510 is the newly inserted GTP information or header. Data packet 245 may then be transmitted by GGSN 220 to an SGSN 225. SGSN 225 may then remove the GTP information, or GTP header, pushed into data packet 245 thereby returning data packet 245 to its original state and resembling data packet 240.

From SGSN 225, data packet 240 may be transmitted to an access point 230 (e.g., a base transceiver station (BTS)), and from access point 230 to a communication device 235. Exemplary mobile communication devices 235 include mobile computing devices such as laptop computers and mobile telephones.

Network 200 also includes network traffic distribution device 250, which includes a plurality of ingress and egress ports. In some cases, an egress port may be a monitor port. Network traffic distribution device 250 may be coupled in-line to a network traffic capture point 265 located along the communication link between GGSN 220 and SGSN 225 and may receive captured network traffic, including data packet 245, via network traffic capture point 265. Network traffic distribution device 250 may also receive captured network traffic, including data packet 245, via a mirror port 260 present on SGSN 225 and/or GGSN 220.

Network traffic distribution device 250 is configured to remove the GTP information, or a GTP header, pushed into or appended to data packet 245 and forward a data packet resembling data packet 240 to one or more external devices 255 via an egress port resident in network traffic distribution device 250. Exemplary external devices 255 include network monitors and network analyzers.

Figure 3:
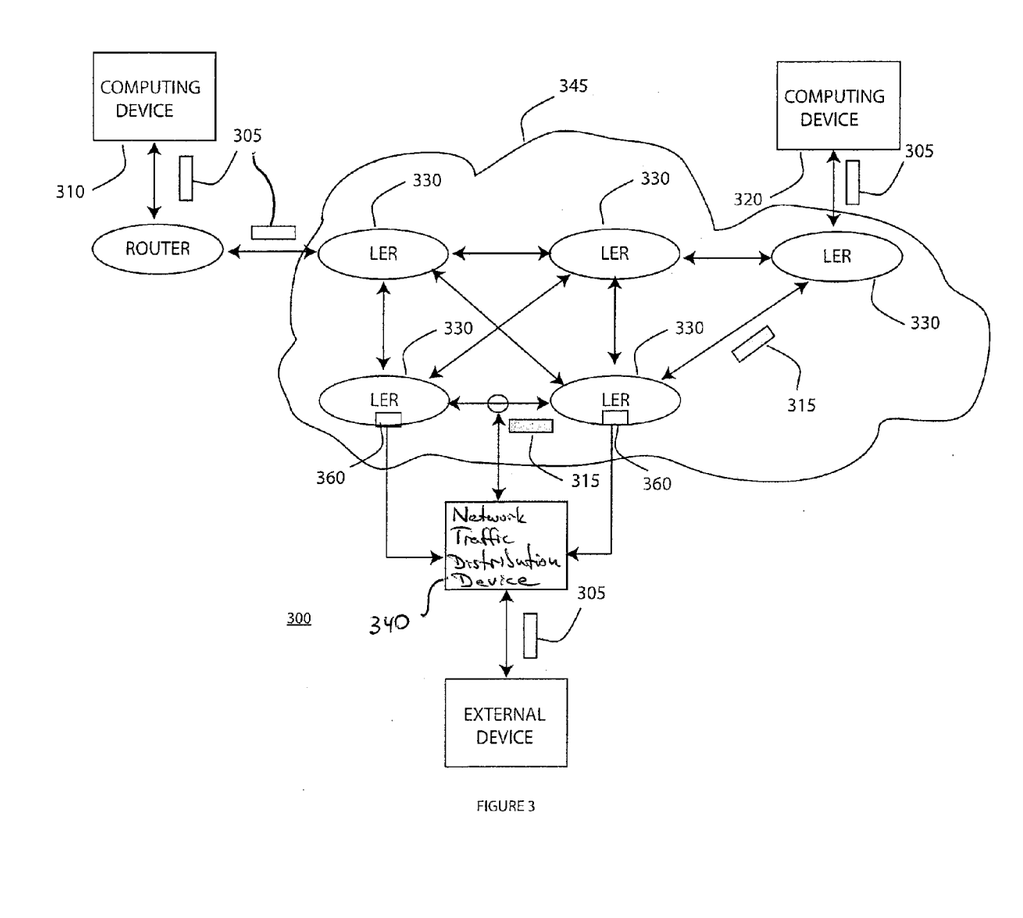
FIG. 3 is a block diagram of an MPLS telecommunications system, configured in accordance with an embodiment of the present invention.

FIG. 3 is a block diagram illustrating an MPLS telecommunications system 300. System 300 may include a computing device 310, which may transmit a data packet 305 to a router 325. Data packet 305 may resemble data packet 502, an example of which is illustrated in FIG. 5b. Router 325 may be connected to a network 345 of one or more LERs and may forward data packet 305 to an LER 330 within the network to enable transmission of data packet 305 through network 345. One or more LERs 330 may include a mirror port 360.

Upon receipt of data packet 305, an LER 330 may push MPLS information, such as an MPLS tag into data packet 305, thereby creating data packet 315. Data packet 315 may resemble data packet 501, shown in FIG. 5a. Data packet 315 may then be transmitted by the subject LER 330 to one or more additional LERs 330 within LER network 345 until data packet 315 reaches a final LER 330 in its transmission path. When data packet 315 reaches the final LER 330, the final LER 330 removes, or "pops off", the MPLS information and transmits data packet 305, in its original state, to computing device 320. Exemplary computing devices 320 include personal computers, laptop computers, and mobile telecommunication devices.

System 300 also includes a network traffic distribution device 340. Network traffic distribution device 340 may include a plurality of ingress and egress ports. In some cases, an egress port may be a monitor port. Network traffic distribution device 340 may be coupled in-line to a network traffic capture point 365 located along a communication link between two or more LER 330 and may receive captured network traffic, including data packet 315, via network traffic capture point 365. Network traffic distribution device 340 may also receive captured network traffic, including data packet 315, via a mirror port 360 present on an LER 330.

Network traffic distribution device 340 is configured to remove the MPLS information, or an MPLS tag, present in data packet 315 and forward a resulting data packet resembling data packet 305 to one or more external devices 345 via an egress port resident in network traffic distribution device 340. Exemplary external devices 345 include network monitors and network analyzers.

In the event that data packet 315 includes more than one set of MPLS information, or MPLS tags, network traffic distribution device 340 may remove some or all of the MPLS information/tags in accordance with, for example, configuration information and/or instructions resident in (e.g., stored in memory) or communicated to network distribution device 340. Data packet 305 may then be transmitted via an egress port resident on network traffic distribution device 340 to external device 345.

Figure 4:
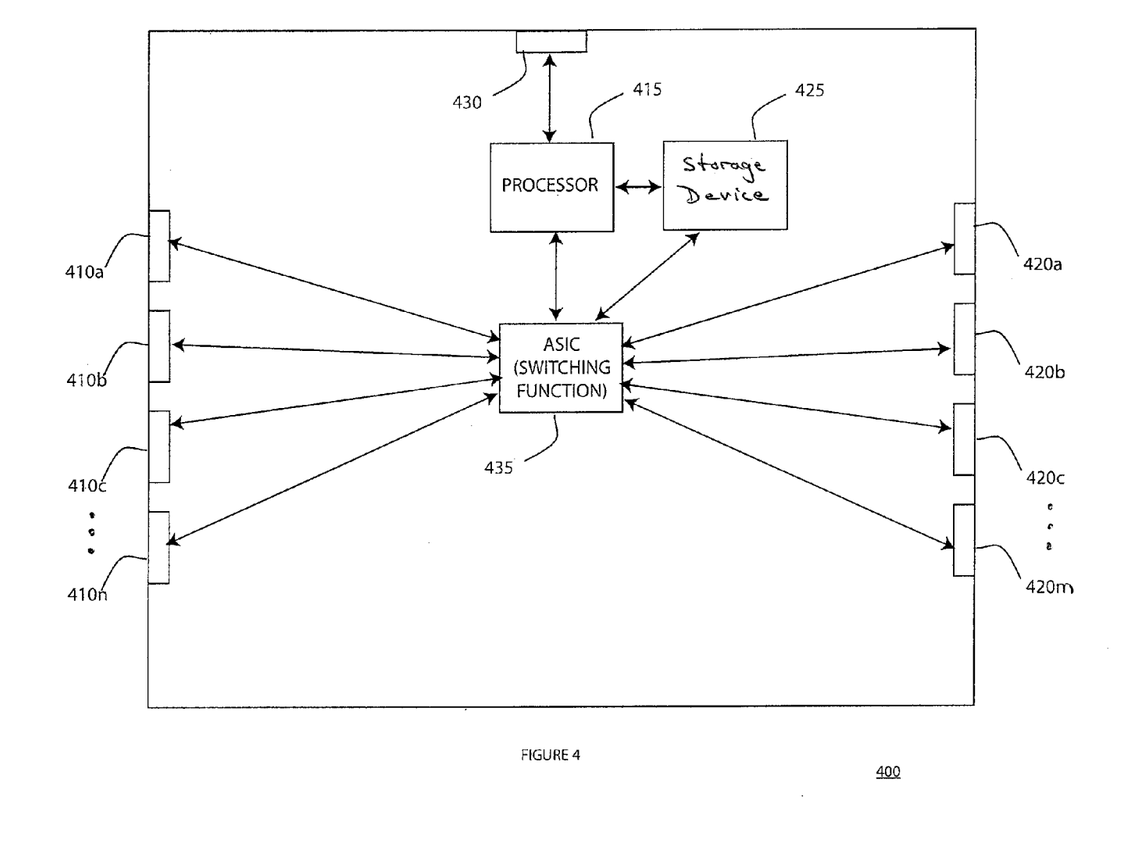
FIG. 4 is a block diagram of a network traffic distribution device, configured in accordance with an embodiment of the present invention.

FIG. 4 is a block diagram illustrating an exemplary network traffic distribution device 400. Network traffic distribution device 400 may be, for example, network traffic distribution device 130, 250, and/or 340.

Network traffic distribution device 400 includes a plurality of ingress ports 410a-410n (for convenience, an ingress port will be referenced generally as ingress port 410) and egress ports 420a-420m (for convenience, an egress port will be referenced generally as egress port 420). One or more egress ports 420 may be configured as a monitoring port. Data packets, such as data packets 145, 245, and 315, may be received by network traffic distribution device 400 via an ingress port 420. Data packets may be received from, or example, a mirror port of a router, LER or other network device and/or an inline traffic capture point.

Received data packets may be forwarded to ASIC 435. ASIC 435 may perform a switching function and may forward the received data packet to a processor 415. Processor 415 may be any appropriate processing device. Processor 415 may process the received data packet according to one or more instructions resident in a memory 425, which may be any appropriate data storage device. The processing functions preformed by processor 415 may include analyzing received data packets, and determining whether received data packets include unwanted information, such as routing information, GTP information, and/or MPLS information. Processor 415 may also process the data packets to remove the unwanted information. Processor 415 may be managed (e.g., configured) by way of a management port 430 (which may, for example, be used to load instructions to be stored in memory 425 and/or processor 415). Once processor 415 processes a data packet, that data packet may be returned by the processor to ASIC 435. ASIC 435 may then transmit the processed data packet to one more egress ports 420 for eventual transition to a device external to network traffic distribution device 400, such as external device 150, 255, and 345.

FIG. 5A illustrates an exemplary data packet 501, which includes unwanted information. Exemplary data packets 501 include data packets 145, 245 and 315. Data packet 501 may include one or more headers 505, unwanted information 510, payload 515, and an old frame check sequence (FCS) and/or a cyclic redundancy check (CRC) 520. Exemplary headers 505 include address information and other information as needed for transmission of data packet 501 details of which are not critical to the present invention. Unwanted information 510 may include, for example, routing information pushed into the data packet by one or more routers, GTP information/header(s), MPLS information/tag(s), VLAN tags, and/or tag protocol identifiers (TPID). Payload 515 may include any payload appropriate for data packet 501.

FIG. 5B illustrates an exemplary data packet 502 that has been stripped of unwanted information 510. Exemplary data packets 502 include data packets 140, 240 and 305. Because data packet 502 has been manipulated to remove unwanted information 510, recalculation and insertion of a new FCS/CRC 530 into data packet 502 is required in order to comply with various data transmission protocols.

Figure 6:
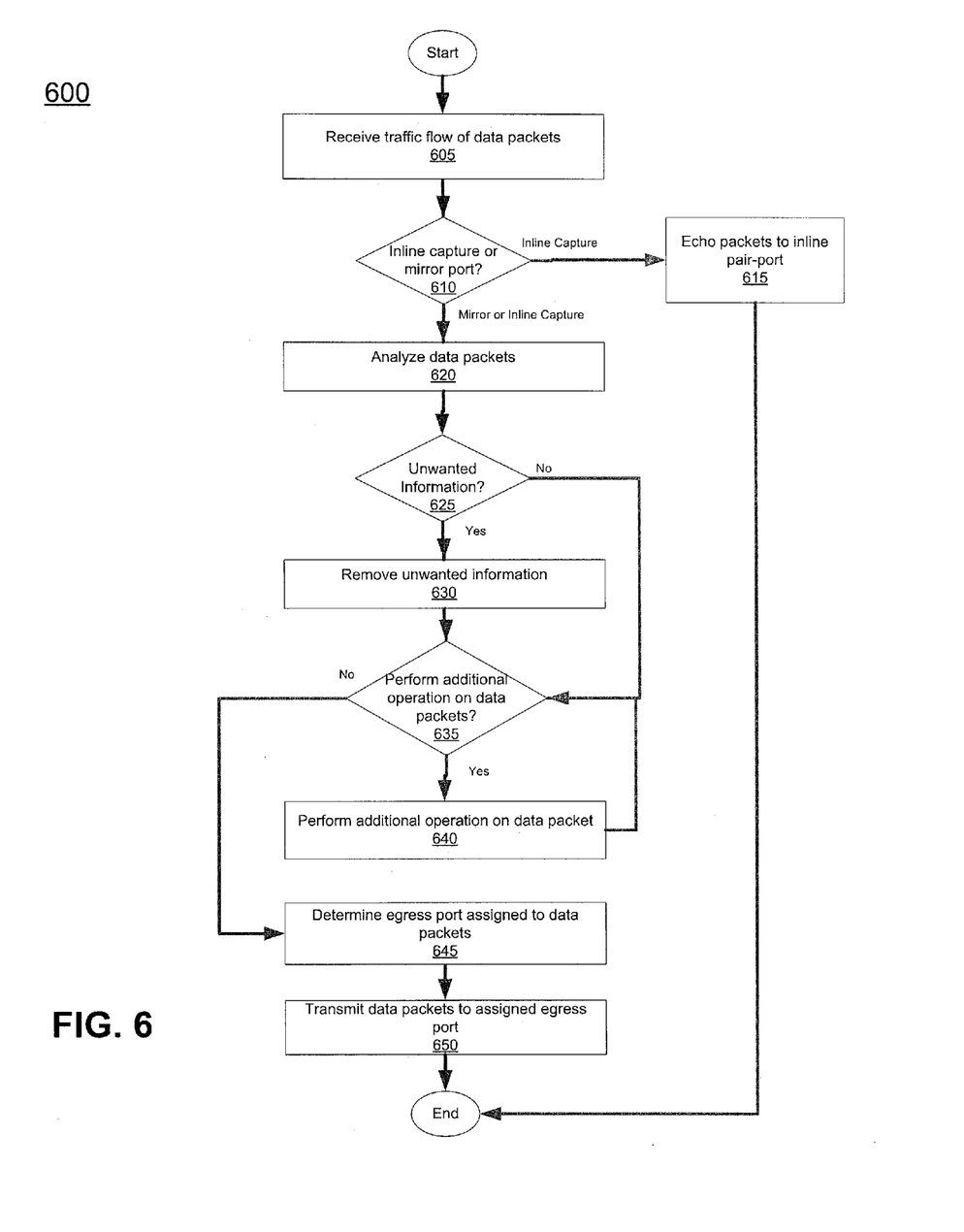
FIG. 6 is a flowchart illustrating a process for removing unwanted information from a data packet, in accordance with an embodiment of the present invention.

FIG. 6 illustrates a process 600 for removing unwanted information from a data packet in accordance with embodiments of the present invention. Process 600 may be performed by a system such as any of systems 100, 200 or 300, or a network traffic distribution device, such as any of network traffic distribution devices 130, 250, 340 or 400.

In step 605, a traffic flow of captured data packets is received by a network traffic distribution device. Captured data packets may include data packets 145, 245, 315 and/or 501. The traffic flow may be received via an ingress port resident on the network traffic distribution device via, for example, an inline traffic capture point like inline traffic capture points 165, 265, and/or 365, or via a mirror port resident on the source of the data packets, like mirror ports 160, 260, and/or 360.

In step 610, it is determined whether the data packets were received via inline capture or a mirror port. When the data packets are received via an inline capture, the data packets may be echoed to an inline pair-port resident on the network traffic distribution device (step 615). An inline pair-port may be an egress port resident in the network traffic distribution device.

When the data packets were received via a mirror port or inline capture, the data packets are analyzed by, for example, a processor (such as processor 415) resident in the network traffic distribution device (step 620). Analysis of the data packets may include searching for and locating unwanted information, such as routing information, GTP information/header(s), MPLS information/tag(s), and/or other tags in a data packet or a traffic flow of data packets.

Step 625 includes determining whether the data packet includes unwanted information. If it is determined that the data packet includes unwanted information, the unwanted information is removed at step 630. In the case where there is no unwanted information in the data packet and/or following removal of the unwanted information at step 630, it may be determined, for example, by a processor such as processor 415, whether additional operations are to performed on the data packet (step 635). Instructions for performing additional operations on the data packet may, for example, be resident in a memory, such as memory 425, or may be communicated to the processor via a management port, such as management port 430. Exemplary additional operations include filtering one or more data packets, aggregating data packets, and load balancing the distribution of data packets across a plurality of egress ports of the network traffic distribution device (step 640).

When the additional operations are finished, or when there are no additional operations to be performed on the data packet, an egress port assigned to the data packet may be determined (step 645). This determination may be based on, for example, configuration information resident in, or communicated to, the network traffic distribution device and/or load balancing or load spreading considerations. In step 650, a data packet without unwanted information, is distributed by the network traffic distribution device to its assigned egress port for eventual transmission to an external device, like external devices 150, 255, and 345. The data packet transmitted in step 650 may resemble data packets 140, 240, 305, and/or 502.

Figure 7:
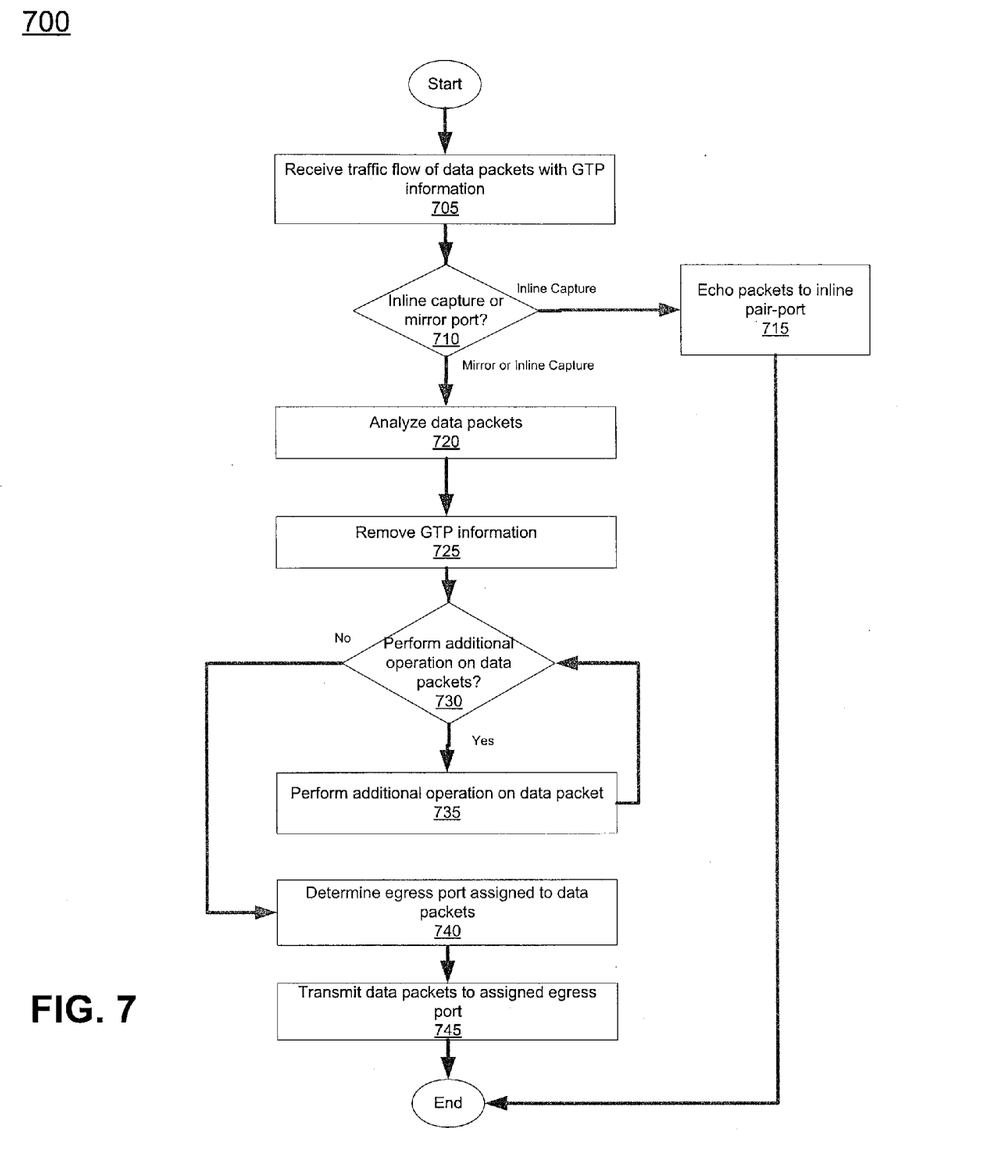
FIG. 7 is a flowchart illustrating a process for removing GTP information from a data packet, in accordance with an embodiment of the present invention.

FIG. 7 illustrates a process 700 for removing GTP information from a data packet or a traffic flow of data packets. Process 700 may be performed by a node within a GSM telecommunications system, such as GSM telecommunications system 200, system 100, and/or a network traffic distribution device such as network traffic distribution device 250.

In step 705, a traffic flow data packets that include GTP information and/or a GTP header may be received by, for example, a network traffic distribution device. The data packets may be received via an inline capture at a traffic capture point like traffic capture point 265 or via a mirror port, like mirror port 260. If the data packets are received via inline capture, they may be echoed to an inline pair port resident on the network traffic distribution device (step 715). An inline pair port may be an egress port. When the data packets are received via an inline capture or a mirror port, they may be analyzed (step 720). This analysis may include searching for and locating GTP information in the data packet and may be performed by a processor resident in the network traffic distribution device. Once the GTP information is located, it is removed (e.g., by the processor) from the data packet (step 725).

In step 730, it may be determined for example, by the processor of the network traffic distribution device, whether additional operations are to be performed on the data packet. Instructions for performing additional operations on the data packet may, for example, be resident in a memory, like memory 425, or may be communicated to the processor via a management port, like management port 430. Exemplary additional operations include filtering one or more data packets, aggregating data packets, and load balancing the distribution of data packets across a plurality of egress ports (step 735).

When the additional operations are finished, or when there are no additional operations to be performed on the data packet, an egress port assigned to the data packet may be determined (step 740). This determination may be based on, for example, configuration information resident in, or communicated to, the network traffic distribution device and/or load balancing or load spreading considerations. In step 745, a data packet without the GTP information/header(s), is distributed by the network traffic distribution device to its assigned egress port for eventual transmission to an external device, like external device 255. The data packet transmitted in step 745 may resemble data packet 240.

Figure 8:
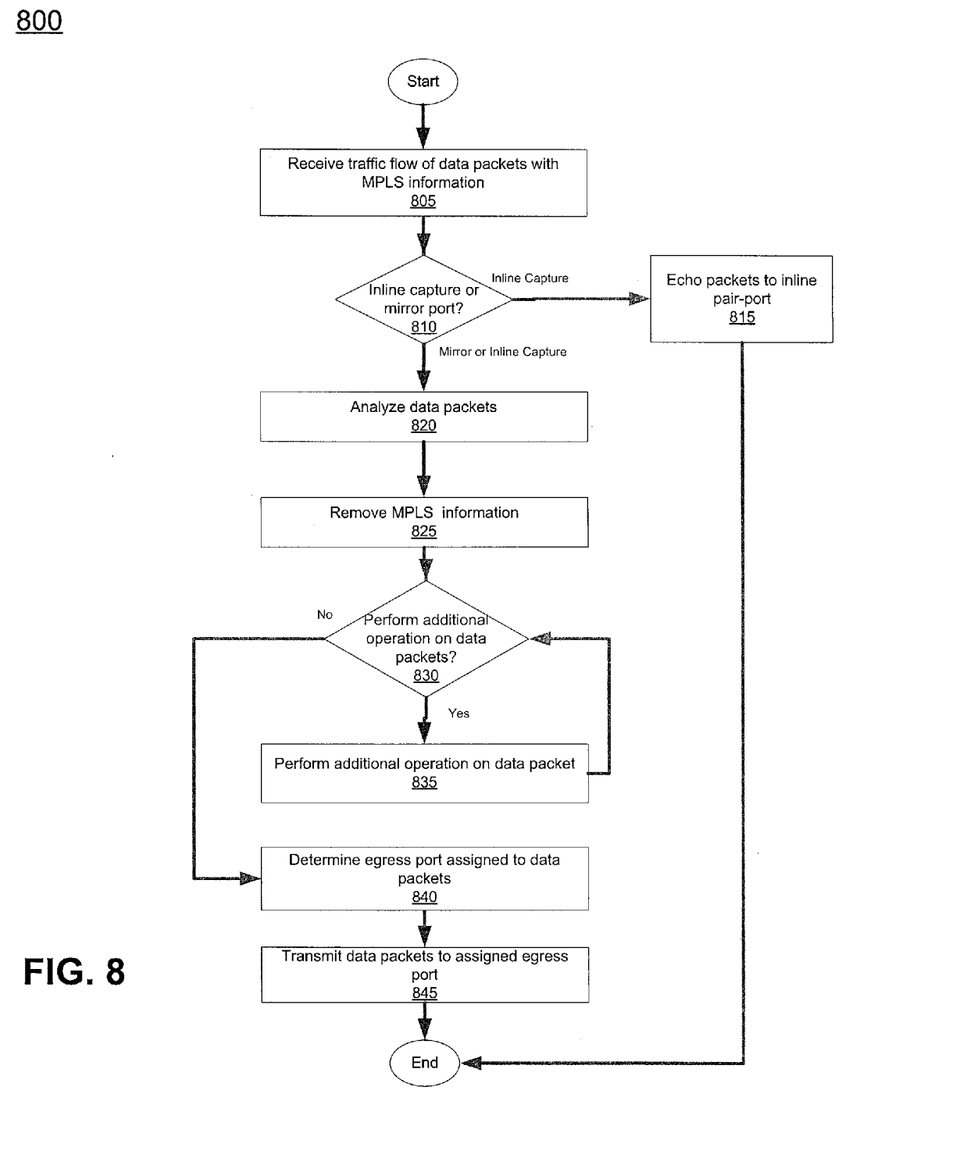
FIG. 8 is a flowchart illustrating a process for removing MPLS information from a data packet, in accordance with an embodiment of the present invention.

FIG. 8 illustrates a process 800 for removing MPLS information from a data packet or a traffic flow of data packets. Process 800 may be performed by a node in a telecommunications system, such as telecommunications system 100 or 300. Process 800 may be executed by a network traffic distribution device such as network traffic distribution device 340 and/or 400.

A traffic flow of data packets with MPLS information may be received by, for example, a network traffic distribution device (step 805) via an inline capture at a traffic capture point like inline capture point 365 or via one or more mirror ports like mirror port 360. If the traffic is determined to be received via an inline capture (step 810), the data packets may be echoed to an inline pair port (step 815). An inline pair port may be an egress port resident in the network traffic distribution device.

When the data packets were received via a mirror port or inline capture, the data packets may be analyzed by, for example, a processor resident in the network traffic distribution device (step 820). Analysis of the data packets may include searching for and locating unwanted information, such as routing information or MPLS information/tag(s) in a data packet or a traffic flow of data packets. On some occasions, one or more sets of MPLS information may be found in the data packet. In step 825, one or more sets of MPLS information may be removed from the data packet. Whether all or only some MPLS information/tags are removed from the data packet may be determined based on configuration information resident in the network traffic distribution device.

Once the MPLS information is removed, it may be determined whether additional operations are to be performed on the data packets (step 830). Instructions for performing additional operations on the data packet may, for example, be resident in a memory, like memory 425, or may be communicated to the processor via a management port, like management port 430. Exemplary additional operations include filtering one or more data packets, aggregating data packets, and load balancing the distribution of data packets across a plurality of egress ports (step 835).

When the additional operations are finished, or when there are no additional operations to be performed on the data packet, an egress port assigned to the data packet may be determined (step 840). This determination may be based on, for example, configuration information resident in, or communicated to, the network traffic distribution device and/or load balancing or load spreading considerations. In step 845, a data packet without the unwanted MPLS information, may be distributed by the network traffic distribution device to its assigned egress port for eventual transmission to an external device, like external device 345. The data packet transmitted in step 845 may resemble data packet 305 and/or 502.

Figure 9:
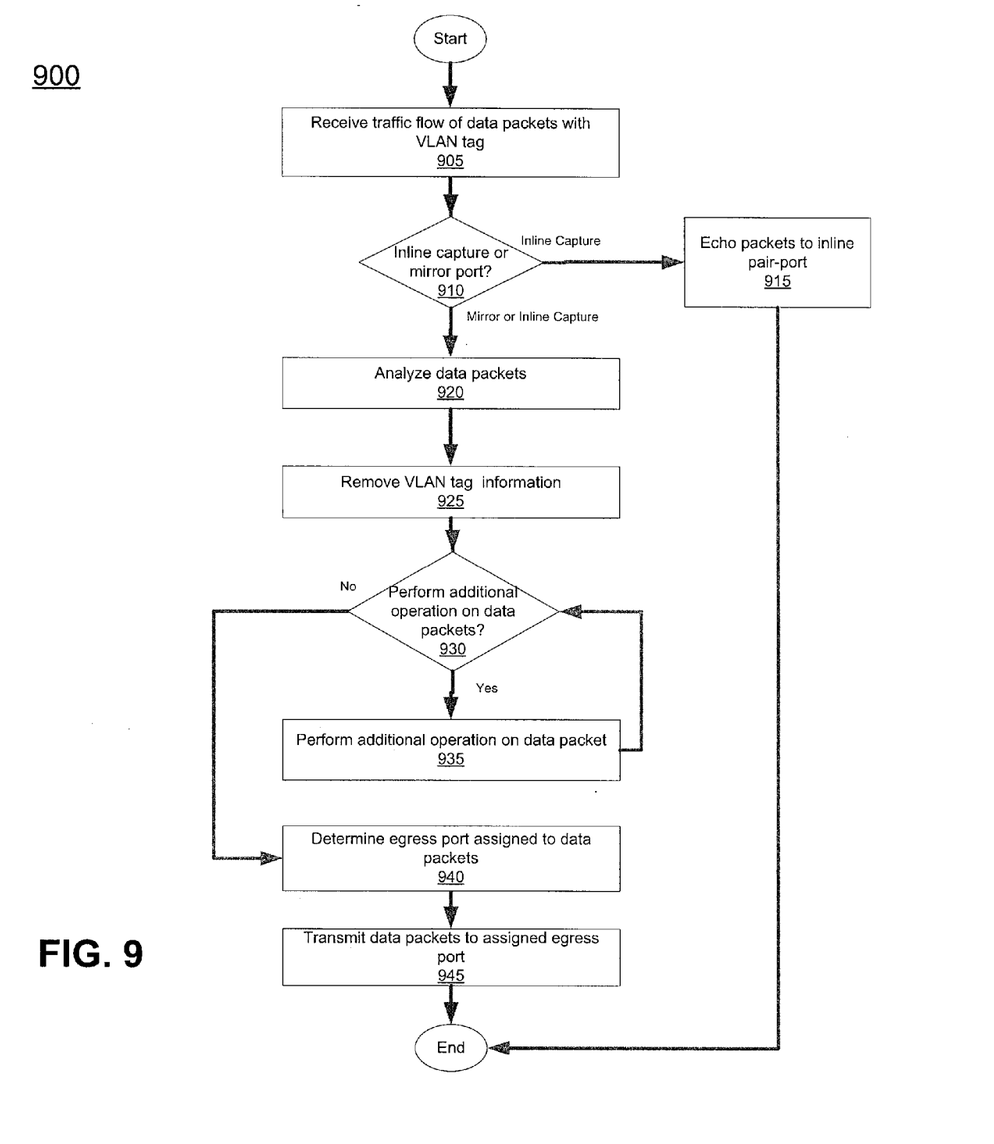
FIG. 9 is a flowchart illustrating a process for removing a VLAN tag from a data packet, in accordance with an embodiment of the present invention.

FIG. 9 illustrates a process 900 for removing a VLAN tag from a data packet or a traffic flow of data packets. Process 900 may be performed by nodes within a system 100, a system compliant with the IEEE 802.1 Q standard for configuring VLANs, a system enabled to transmit and/or receive data packets including VLAN tags, and/or a network traffic distribution device such as network traffic distribution device 130.

In step 905, a traffic flow of data packets that include VLAN tags may be received by, for example, a network traffic distribution device. A determination is made as to whether the data packets were received via an inline capture at a traffic capture point, like traffic capture point 165, or via a mirror port, like mirror port 160 (step 910). If the data packets are received via inline capture, they may be echoed to an inline pair port resident on the network traffic distribution device (step 915). An inline pair port may be an egress port of the network traffic distribution device. When the data packets are received via an inline capture or a mirror port, they may be analyzed (step 920). The analysis may include searching for and locating VLAN tags in the data packet. The analysis may be performed by a processor resident in the network traffic distribution device, such as processor 415, that is operating in a VLAN tag search state.

In some cases, the analysis of step 920 may further include clocking or counting 16 bits into a data packet and analyzing the set of 16 bits to determine whether they are equal to a Tag Protocol Identifier (TPID). When the set of 16 bits are equal to a TPID, then the set 16 bits may be, or include, a VLAN tag. The following set of 16 bits may also be identified as a VLAN tag. Depending on the configuration information for the processor, the processor may continue to search for one or more additional VLAN tags in the data packet. When all VLAN tags are found, the processor may exit the VLAN search state. Once the TPID and/or VLAN tag(s) is (are) located, it (they) may be removed from the data packet. (step 925).

In step 930, it may be determined for example, by a processor like processor 415, whether additional operations are to be performed on the data packet. Instructions for performing additional operations on the data packet may, for example, be resident in a memory, like memory 425, or may be communicated to the processor via a management port, like management port 430. Exemplary additional operations include filtering one or more data packets, aggregating data packets, and load balancing the distribution of data packets across a plurality of egress ports (step 935).

When the additional operations are finished, or when there are no additional operations to be performed on the data packet, an egress port assigned to the data packet may be determined (step 940). This determination may be based on, for example, configuration information resident in, or communicated to, the network traffic distribution device and/or load balancing or load spreading considerations. In step 945, a data packet without unwanted information, may be distributed by the network traffic distribution device to its assigned egress port for eventual transmission to an external device, like external device 255. The data packet transmitted in step 945 may resemble data packet 240.

Thus, methods, systems and apparatus for removing unwanted information from data packets have been presented. In the preceding discussion various embodiments of the present invention were described as being implemented with the aid of computer-implemented processes or methods (a.k.a. programs or routines). Such programs may be rendered in any computer-readable language and, in general, are meant to encompass any series of logical steps performed in a sequence to accomplish the stated purpose. Any part of the foregoing description that was presented in terms of algorithms and/or symbolic representations of operations on data within a computer memory should be understood as steps requiring physical manipulations of physical quantities (usually represented in the form of electrical or magnetic signals) within computer-readable storage devices. Accordingly, throughout the preceding description of the present invention, terms such as "processing", "computing", "calculating", "determining", "displaying" or the like, should be understood as referring to the actions and processes of an appropriately programmed computer processor, or similar electronic device, that manipulates and transforms data represented as physical (electronic) quantities within the computer processor's registers and any associated memories or other storage devices into other data similarly represented as physical quantities within those memories or registers or other such information storage devices. The programs comprise computer-executable instructions stored on one or more such computer-readable storage mediums accessible to the computer processor, for example any type of disk including hard disks, floppy disks, optical disks, compact disk read only memories (CD-ROMs), and magnetic-optical disks, ROMs, RAMs, EPROMs, EEPROMs, flash memories, or other forms of storage media accessible to the computer processor.

What is claimed is:

1. A method comprising:
receiving, at a network traffic distribution device that includes a plurality of ingress and egress ports, a traffic flow of captured data packets, the captured data packets being at least one of a copy and a representation of data packets flowing through a communication network, wherein the captured data packets are received via at least one of a mirror port resident on a source of the captured data packets or a traffic capture point located along a communication link between two communicating devices;
analyzing, by the network traffic distribution device, the received captured data packets to determine whether the received captured data packets include unwanted information, and, if so, removing the unwanted information;
determining, by the network traffic distribution device, an assigned egress port for the received captured data packets; and
transmitting, by the network traffic distribution device, the captured data packets, without the unwanted information, to the assigned egress port.

2. The method of claim 1, wherein the unwanted information includes information pushed into or appended to the captured data packets by a router.

3. The method of claim 1, wherein the unwanted information includes one of general packet radio service (GPRS) tunneling protocol (GTP) information and multi-protocol label switching (MPLS) information.

4. The method of claim 1, further comprising:
performing an additional operation on the captured data packets after removal of the unwanted information.

5. The method of claim 4, wherein the additional operation is at least one of: filtering the captured data packets, aggregating the captured data packets, and balancing transmission of the captured data packets after removal of the unwanted information across the plurality of egress ports.

6. The method of claim 1, wherein determining the assigned egress port assigned is based on configuration information stored at the network traffic distribution device.

7. The method of claim 1, wherein the assigned egress port is a monitoring port.

8. The method of claim 1, wherein the unwanted information is a virtual local area network (VLAN) tag.

9. A method, comprising:
receiving, at a network traffic distribution device, a captured data packet that includes general packet radio service (GPRS) tunneling protocol (GTP) information, the captured data packets being at least one of a copy and a representation of data packets flowing through a communication network;
analyzing the captured data packet to locate the GTP information;
removing the GTP information from the captured data packet;
determining an assigned monitoring port of the network traffic distribution device for the captured data packet; and
transmitting the captured data packet, without the GTP information, to the assigned monitoring port.

10. A method comprising:
receiving, at a network traffic distribution device, a captured data packet that includes Multiprotocol Label Switching (MPLS) information, the captured data packets being at least one of a copy and a representation of data packets flowing through a communication network;
analyzing the captured data packet to locate the MPLS information;
removing the MPLS information from the captured data packet;
determining an assigned monitoring port of the network traffic distribution device for the captured data packet; and
transmitting the captured data packet, without the MPLS information, to the assigned monitoring port.

11. A system comprising:
a pair of routers, a first one of the routers for pushing into or appending to a data packet routing information and transmitting the data packet to a second one of the routers via a communication link coupling the routers to one another, wherein at least one of the routers includes a mirror port;
a network traffic distribution device coupled to receive, via an ingress port of the network traffic distribution device, captured data packets from at least one of the mirror port and a traffic capture point located on the communication link, the captured data packets being at least one of a copy and a representation of data packets flowing through a communication network, the network traffic distribution device further configured to remove the information pushed into or appended to the captured data packet and to transmit the captured data packet, without the information, to an external device; and
the external device communicatively coupled to receive the captured data packet, absent the information, from the network traffic distribution device.

12. A network traffic distribution device comprising:
a plurality of ingress ports for receiving captured data packets which that include unwanted information, the captured data packets being at least one of a copy and a representation of data packets flowing through a communication network;
a processor for processing the captured data packets to remove the unwanted information and thereby create processed captured data packets; and
an application specific integrated circuit for routing received captured data packets from the ingress ports to the processor and for routing the processed captured data packets from the processor to respective, assigned ones of a plurality of egress ports, which egress ports are for transmitting the processed captured data packets from the network traffic distribution device.

13. The network traffic distribution device of claim 12, further comprising a data store for storing a set of instructions executable by at least one of the processor and the application specific integrated circuit.

* * * * *